(12) United States Patent
Choi et al.

(10) Patent No.: US 12,270,329 B1
(45) Date of Patent: Apr. 8, 2025

(54) CONTROL OF COLD LIGHT OFF CATALYST

(71) Applicant: FCA US LLC, Auburn Hills, MI (US)

(72) Inventors: Jeongyong Choi, Rochester, MI (US); Michael Barkey, Maidstone (CA); William Attard, Brighton, MI (US); Filip Vucak, Windsor (CA)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 18/525,987

(22) Filed: Dec. 1, 2023

(51) Int. Cl.
| F02B 37/18 | (2006.01) |
| F01N 3/28  | (2006.01) |
| F02B 37/12 | (2006.01) |
| F02B 37/22 | (2006.01) |
| F02D 41/00 | (2006.01) |
| F02D 41/18 | (2006.01) |

(52) U.S. Cl.
CPC .......... *F02B 37/183* (2013.01); *F01N 3/2892* (2013.01); *F02B 37/12* (2013.01); *F02B 37/18* (2013.01); *F02B 37/22* (2013.01); *F02D 41/0007* (2013.01); *F02D 41/18* (2013.01); *F02D 2200/0406* (2013.01); *F02D 2200/0802* (2013.01)

(58) Field of Classification Search
CPC ........ F02B 37/12; F02B 37/18; F02B 37/183; F02B 37/22; F02D 41/0007; F02D 41/18; F02D 2200/0406; F02D 2200/0802; F02D 11/105; F01N 3/2006; F01N 3/2892
See application file for complete search history.

(56) References Cited

U.S. PATENT DOCUMENTS

| 2010/0263641 | A1* | 10/2010 | Hagelstein | .......... F02B 29/0437 123/568.21 |
| 2014/0137553 | A1* | 5/2014 | Ulrey | .................... F02B 37/186 251/12 |
| 2020/0095913 | A1* | 3/2020 | Rohde | ..................... F01N 3/208 |

\* cited by examiner

*Primary Examiner* — Loren C Edwards
(74) *Attorney, Agent, or Firm* — Jeremy J. Klobucar (57) ABSTRACT

A control system for an engine comprising a turbocharger includes a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to determine an engine torque request; determine an intake manifold pressure target; determine whether an intake manifold pressure target is greater than a barometric pressure; command the CLOC valve to a first position whereby exhaust flow is routed, at least partially, to the CLOC in a CLOC mode based on the intake manifold pressure target is not greater than the barometric pressure; and command the CLOC valve to a second position whereby exhaust flow is routed fully to the turbocharger based on the intake manifold pressure target is greater than the barometric pressure.

7 Claims, 6 Drawing Sheets

CONTROL OF COLD LIGHT OFF CATALYST

FIELD

The present application relates to vehicle emission systems and, more particularly, to techniques for controlling a valve that directs exhaust flow around the turbocharger and into a cold light off catalyst.

BACKGROUND

As is known, pollutant emissions such as nitrogen oxides (NOx), carbon monoxide (CO), and hydrocarbon (HC) are temperature sensitive in aftertreatment systems. Such emission conversion begins at high temperatures such as over 350 C depending on catalyst formulation. Typically at engine startup, idle exhaust temperatures are much below the high temperatures needed for optimal catalyst efficiencies. An amount of time is needed for the exhaust to heat up from the typical exhaust temperatures to the elevated temperatures that satisfy a desired efficiency target. Operation of the engine during this heating up time is inefficient for conversion of such pollutants. Accordingly, a need exists in the art to improve upon efficiencies of aftertreatment systems.

SUMMARY

According to one example aspect of the invention, a control system for an engine comprising a turbocharger includes a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to determine an engine torque request; determine an intake manifold pressure target; determine whether an intake manifold pressure target is greater than a barometric pressure; command the CLOC valve to a first position whereby exhaust flow is routed, at least partially, to the CLOC in a CLOC mode based on the intake manifold pressure target not being greater than the barometric pressure; and command the CLOC valve to a second position whereby exhaust flow is routed fully to the turbocharger based on the intake manifold pressure target is greater than the barometric pressure.

In some implementations, commanding the CLOC valve to the first position comprises commanding the CLOC valve to a position wherein all exhaust flow is directed to the CLOC.

In other implementations, the controller is further configured to modulate the CLOC valve whereby exhaust flow is routed, at least partially, to the CLOC and at least partially to the turbocharger.

In additional implementations, the controller is configured to modulate the CLOC valve based on an optimization model that determines an optimal balance between engine torque requirements and emissions requirements.

According to another example aspect of the invention, a control system for an engine comprising a turbocharger includes a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to determine an engine torque request; determine a turbine flow request; determine a minimum CLOC valve open position and maximum turbine flow; determine whether the turbine flow request is greater than the maximum turbine flow; command the CLOC valve to a first position whereby exhaust flow is routed, at least partially, to the CLOC in a CLOC mode based on the turbine flow request not being greater than the maximum turbine flow; and command the CLOC valve to a second position whereby exhaust flow is routed fully to the turbocharger based on the turbine flow request being greater than the maximum turbine flow.

In some implementations, commanding the CLOC valve to the first position comprises commanding the CLOC valve to a position wherein all exhaust flow is directed to the CLOC.

In some implementations, determining the turbine flow request includes receiving a signal based on an accelerator pedal input.

In other implementations, the controller is further configured to modulate the CLOC valve whereby exhaust flow is routed, at least partially, to the CLOC and at least partially to the turbocharger.

In additional implementations, the controller is configured to modulate the CLOC valve based on an optimization model that determines an optimal balance between engine torque requirements and emissions requirements.

According to another example aspect of the invention, a control system for an engine comprising a turbocharger includes a cold light off catalyst (CLOC), a CLOC valve, and a controller. The CLOC is positioned in a bypass passage around a turbine of the turbocharger. The CLOC valve selectively routes exhaust flow from the engine between the turbine and the CLOC. The controller is configured to determine whether full turbine is required to meet the engine torque request; command the CLOC valve to a first position whereby exhaust flow is routed, at least partially, to the CLOC in a CLOC mode based on determining that full turbine is not required to meet the engine torque request; and command the CLOC valve to a second position whereby exhaust flow is routed fully to the turbocharger based on determining that full turbine is required to meet the engine torque request.

In additional implementations, commanding the CLOC valve to the first position comprises commanding the CLOC valve to a position wherein all exhaust flow is directed to the CLOC.

In additional implementations, determining whether full turbine is required includes determining a turbine flow request based on an accelerator pedal input.

In other implementations, the controller is further configured to modulate the CLOC valve whereby exhaust flow is routed, at least partially, to the CLOC and at least partially to the turbocharger.

In additional implementations, the controller is configured to modulate the CLOC valve based on an optimization model that determines an optimal balance between engine torque requirements and emissions requirements.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do

DETAILED DESCRIPTION

The present disclosure is directed toward emission control on turbocharged engines. A system and related techniques are described for controlling a cold start light off catalyst (CLOC) where a CLOC valve is controlled to divert exhaust gas from the turbine of the turbocharger and through a small catalyst in a CLOC mode. The CLOC can achieve high efficiency quickly to treat the exhaust gas, while a much larger downstream catalyst is warming up. Control techniques disclosed herein provide an exhaust flow split strategy to deliver some turbine power (exhaust flow through the turbocharger) to enable some boost, while the benefits of CLOC (high emission conversion efficiency quickly after engine start) are realized with the remainder of the exhaust flow (as it passes through the CLOC). In other examples, control can determine when boost is required, to disable the CLOC (direct all exhaust into the turbocharger with the CLOC valve) to deliver the requested torque.

Figure 1:
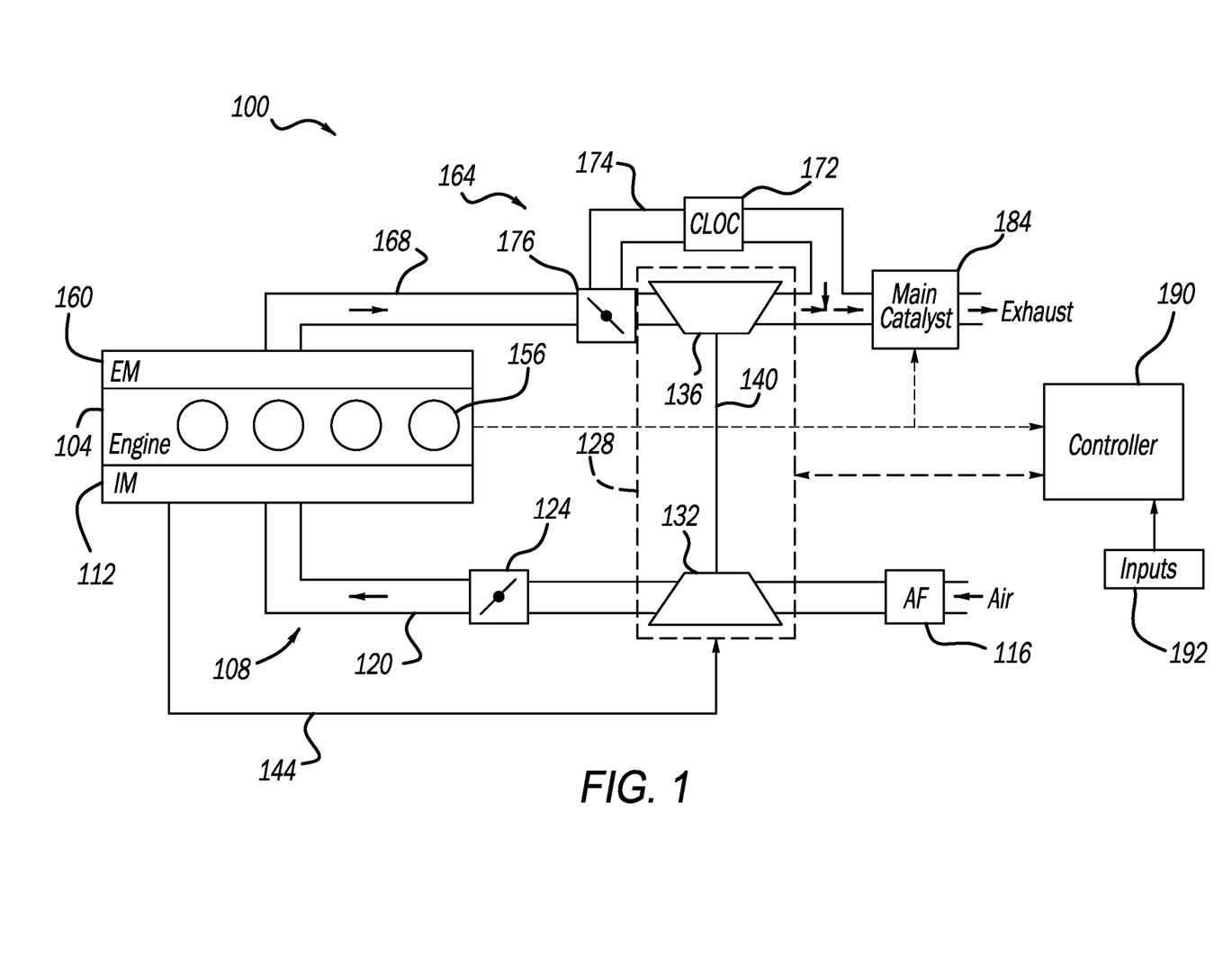
FIG. 1 is a diagram of an example vehicle comprising a turbocharged engine incorporating a cold light off catalyst (CLOC) and CLOC valve according to the principles of the present disclosure.

Referring now to FIG. 1, a diagram of an example vehicle or vehicle control system 100 is illustrated. The vehicle 100 includes an engine 104 configured to combust an air/fuel mixture to generate drive torque. The engine 104 includes an intake system 108 that draws fresh air into an intake manifold (IM) 112 through an air filter (AF) 116 and an induction passage 120. A throttle valve 124 regulates a flow of air through the induction passage 120. A turbocharger 128 comprises a compressor 132 (e.g., a centrifugal compressor) that pressurizes or forces the air through the induction passage 120. The compressor 132 is coupled to a turbine 136 (e.g., a twin-scroll turbine) of the turbocharger 136 via a shaft 140.

The pressurized air is distributed to a plurality of cylinders 156 and combined with fuel (e.g., from respective direct-injection or port-injection fuel injectors) to form an air/fuel mixture. While four cylinders are shown, it will be appreciated that the engine 104 could include any number of cylinders. The air/fuel mixture is compressed by pistons (not shown) within the cylinders 156 and combusted (e.g., via spark from respective spark plugs) to drive the pistons, which turn a crankshaft (not shown) to generate drive torque. The drive torque is then transferred to a driveline (not shown) of the vehicle 100, e.g., via a transmission (not shown). Exhaust gas resulting from combustion is expelled from the cylinders 156 and into an exhaust manifold (EM) 160 of the engine 104.

The exhaust gas from the exhaust manifold 160 is provided to an exhaust system 164 comprising an exhaust passage 168. Kinetic energy of the exhaust gas drives the turbine 136, which in turn drives the compressor 132 via the shaft 140. A cold light off catalyst (CLOC) 172 is routed in a bypass passage 174 around the turbine 136. A CLOC valve 176 selectively controls exhaust flow into the turbine 136 of the turbocharger 128 and/or into the CLOC 172 via the bypass passage 174. Explained further, the CLOC valve 176 moves between a fully open position whereby all exhaust gas is routed to the turbine 136, a fully closed position whereby all exhaust gas is routed to the CLOC 172, and infinite positions therebetween causing a blend of exhaust to be routed to both of the turbine 136 and the CLOC 172. As used herein a "CLOC mode" is used to refer to the controller 190 commanding the CLOC valve 176 to rout at least some exhaust to the CLOC 172. A main exhaust gas treatment system 184, such as a catalytic converter, treats exhaust gas to decrease or eliminate emissions before it is released into the atmosphere. All exhaust gas regardless of passing through the turbine 136 or the CLOC 172 is directed to the main exhaust gas treatment system 184. The CLOC 172 includes a small catalyst that can reach high efficiency quickly and treat the exhaust gas such as when the main catalyst 184 has yet to reach optimal operating temperature.

Lubrication oil from the engine 104 is routed through an oil line 144 to the turbocharger 128 to lubricate components of the turbocharger 128. In examples, the oil is sourced from the engine 104 at the sump.

A controller, also referred to herein as an engine controller, 190 controls operation of the vehicle 100. Examples of components controlled by the controller 190 include the engine 104, the throttle valve 124, and the CLOC valve 176. It will be appreciated that the controller 190 controls specific components of the vehicle 100 that are not illustrated, such as, but not limited to, fuel injectors, spark plugs, an EGR valve, a VVC system (e.g., intake/exhaust valve lift/actuation), a transmission, and the like. The controller 220 controls operation of these various components based on measured and/or modeled parameters. Inputs 192 such as one or more sensors are configured to measure one or more parameters, and communicate signals indicative thereof to the controller 190 (pressures, temperatures, speeds, etc.) as discussed in greater detail herein. Other parameters could be modeled by the controller 190, e.g., based on other measured parameters. The controller 190 is also configured to perform the engine/turbocharger control techniques.

Figure 2:
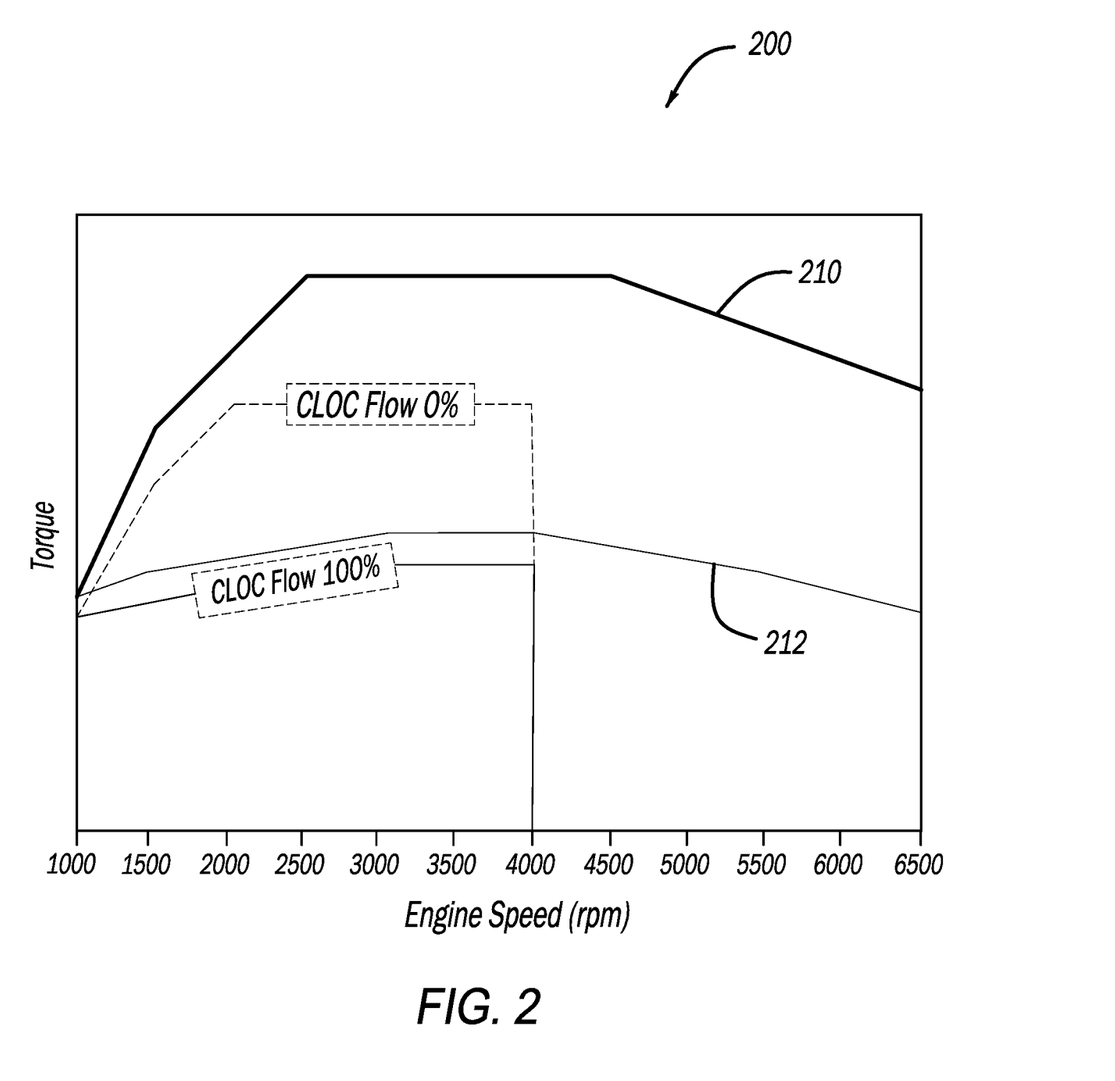
FIG. 2 is a plot of engine speed versus torque illustrating maximum torque for boosted conditions and for CLOC fully open conditions according to examples of the present disclosure.

Turning now to FIG. 2, a plot of engine speed versus torque illustrating maximum torque for boosted conditions and for CLOC fully open conditions according to examples of the present disclosure is shown and generally identified at reference numeral 220. A maximum torque limit for a boosted engine condition (CLOC valve 176 not diverting flow to the CLOC 172) is identified at 210. A maximum torque limit for a CLOC valve 176 diverting flow to the CLOC 172 is identified at 212. As shown, when the exhaust flow is diverted to the CLOC 172 (CLOC flow 100%), the potential engine output is reduced.

In examples, as described herein, the present disclosure provides control strategies provide an exhaust flow split strategy to deliver some turbine power (exhaust flow through the turbocharger 128) to enable some boost, while the benefits of CLOC (high emission conversion efficiency quickly after engine start) are realized with the remainder of the exhaust flow (as it passes through the CLOC 172). In other examples, control can determine when boost is required, to disable the CLOC 172 (direct all exhaust into the turbocharger 128 with the valve 176) to deliver the requested torque.

Figure 3:
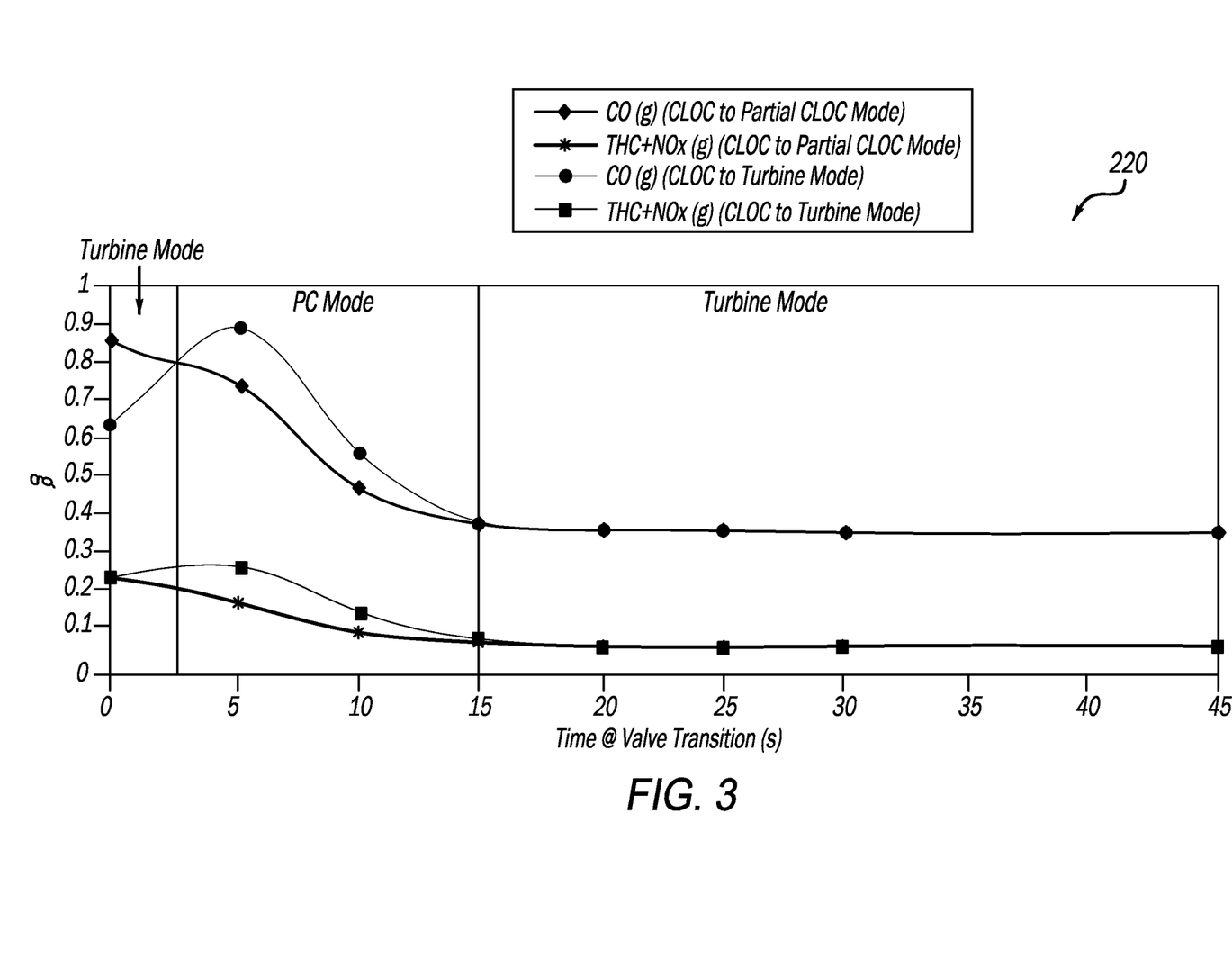
FIG. 3 is a plot of tailpipe emission versus time for turbine mode and partial CLOC mode according to examples of the present disclosure.

With reference to FIG. 3, a plot of tailpipe emission versus time for turbine mode and partial CLOC mode according to examples of the present disclosure is shown and generally identified at reference 220. As discussed herein, it is not always possible to run CLOC mode during catalyst 184 warming due to external torque requests (driver pedal increase etc.). This occurs as the CLOC bypasses the turbocharger and alters the torque achievable. The techniques described herein arbitrate between CLOC mode, turbine mode or partial CLOC mode depending on torque requirements and emissions requirements.

Figure 4:
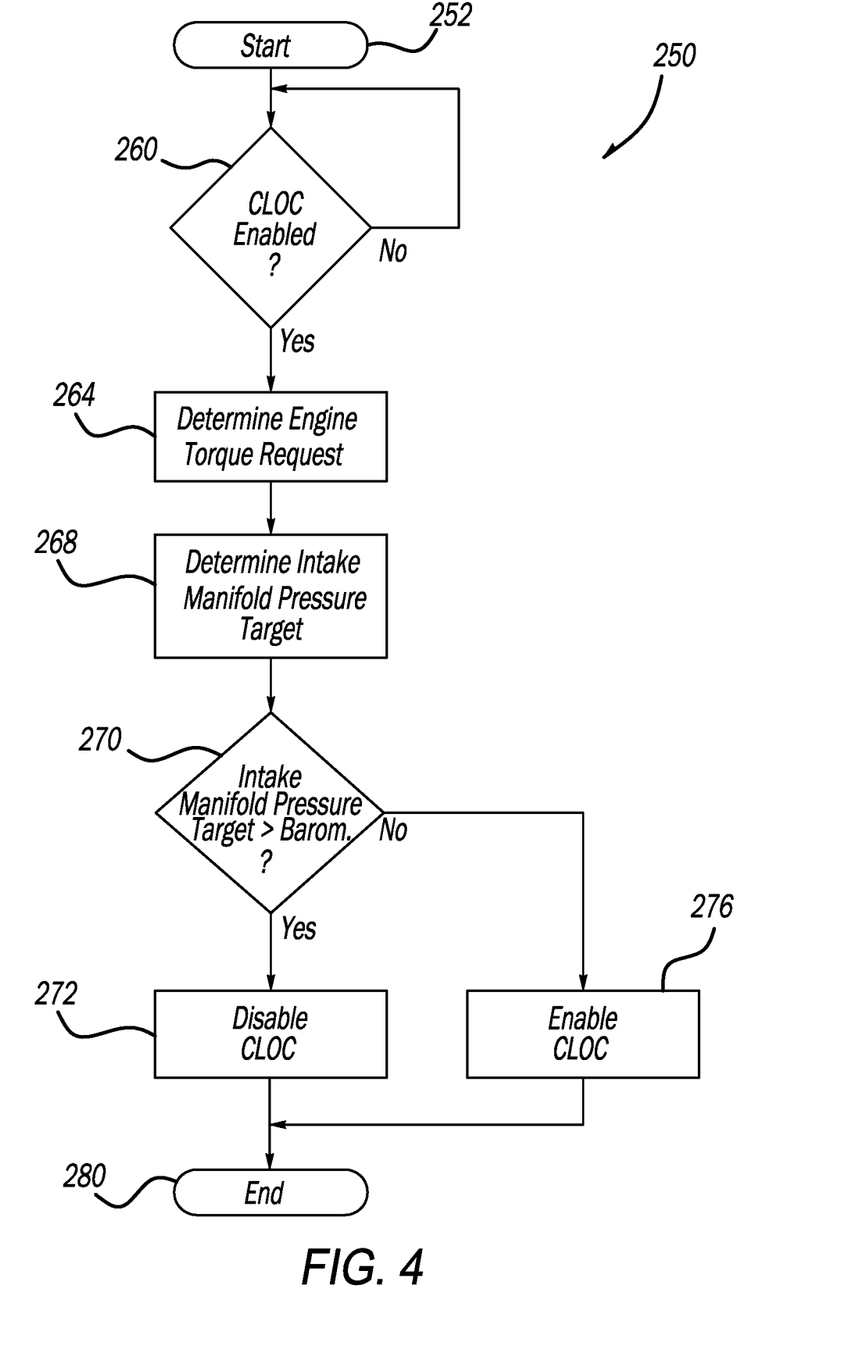
FIG. 4 is a flow diagram of example control of the cold light off catalyst at high torque request according to examples of the present disclosure.

Referring now to FIG. 4, a flow chart of an example method 250 of operating the engine 104 having the turbocharger 128, CLOC 172 and CLOC valve 176 is illustrated. For explanatory purposes, components of the vehicle 100 will be referenced, but it will be appreciated that this method 250 could be used for any engine having a turbocharger and CLOC. Control starts at 252. At 260, the controller 190 determines whether CLOC is enabled. Again, CLOC operation can be enabled such as at startup of the engine 104 when the main catalyst 184 has not reached optimal operating temperature. At 320 control determines an engine torque request at 264. At 268 control determines an intake manifold pressure target. At 270 control determines whether the intake manifold pressure target is greater than a barometric pressure. If not, control enables CLOC mode at 276. If yes, control disables CLOC mode at 272. Control ends at 280.

Figure 5:
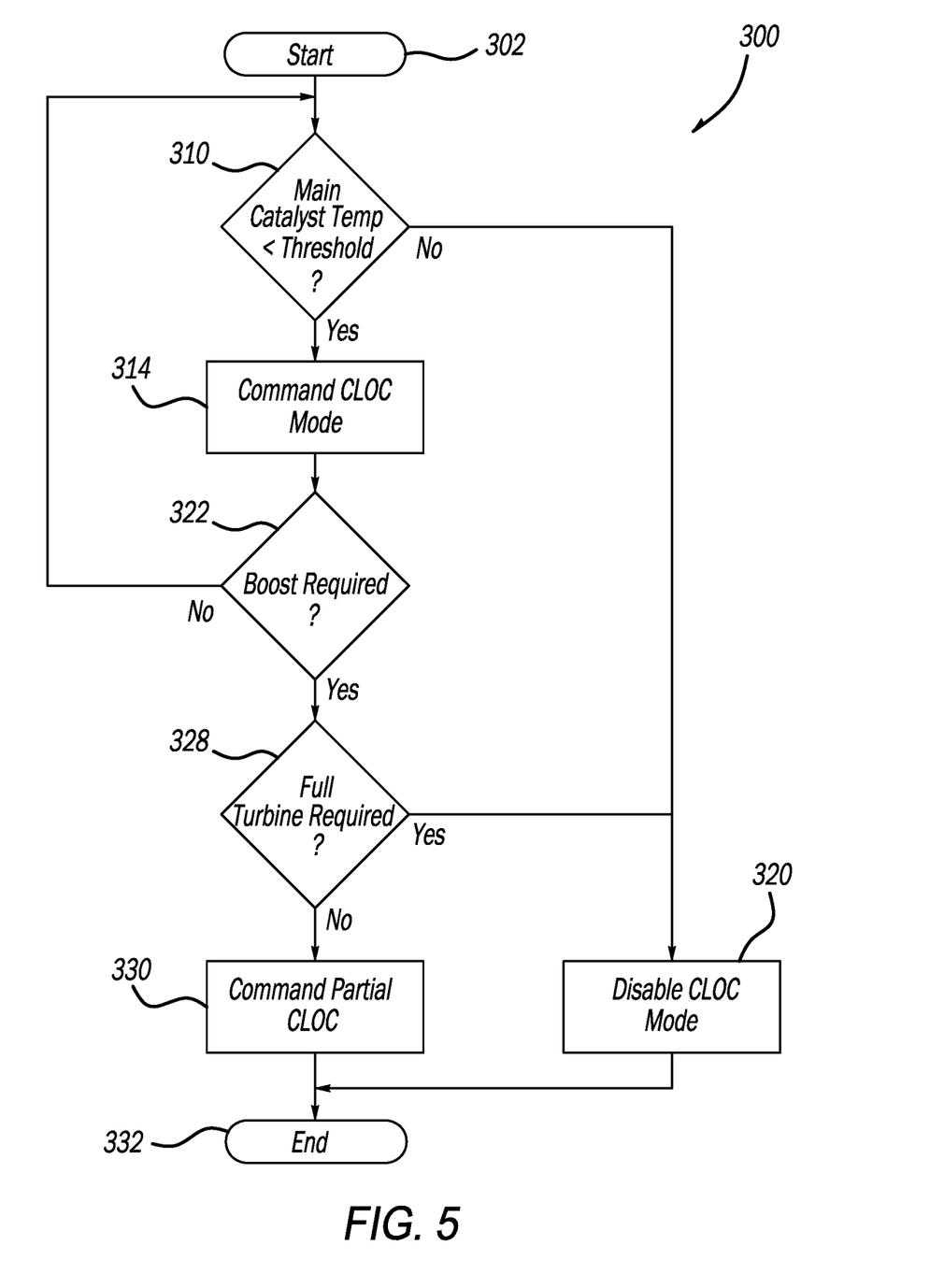
FIG. 5 another flow diagram of example control of the cold light off catalyst at high torque request according to examples of the present disclosure.

Referring now to FIG. 5, a flow chart of an example method 300 of operating the engine 104 having the turbocharger 128, CLOC 172 and CLOC valve 176 is illustrated. For explanatory purposes, components of the vehicle 100 will be referenced, but it will be appreciated that this method 300 could be used for any engine having a turbocharger and CLOC. Control starts at 302. At 310 control determines whether a main catalyst temperature is less than a threshold. If not, control disables CLOC mode at 320. If control determines that a main catalyst temperature is less than a threshold, control commands CLOC mode at 314. At 322 control determines whether boost is required. Again, boost can be required based on a throttle input at 192. If not, control loops to 310.

If control determines that boost is required, control determines whether full turbine is required to satisfy the boost at 328. If yes, control disables CLOC mode at 320. If control determines that full turbine is not required, control commands partial CLOC mode at 330. Again, partial CLOC mode includes modulating the position of the CLOC valve 176 between fully open and fully closed to blend exhaust flow between the turbocharger 128 and the CLOC 172. Partial CLOC mode as disclosed herein includes partial CLOC opening at the CLOC valve 176 or switching to turbine mode depending on the torque and emissions requirements. In examples, models can be used to optimize the balance between the amount of exhaust flow to the turbocharger 128 and/or the CLOC 172. Control ends at 332. The controller is configured to modulate the CLOC valve 176 based on an optimization model that determines an optimal balance between engine torque requirements and emissions requirements.

Figure 6:
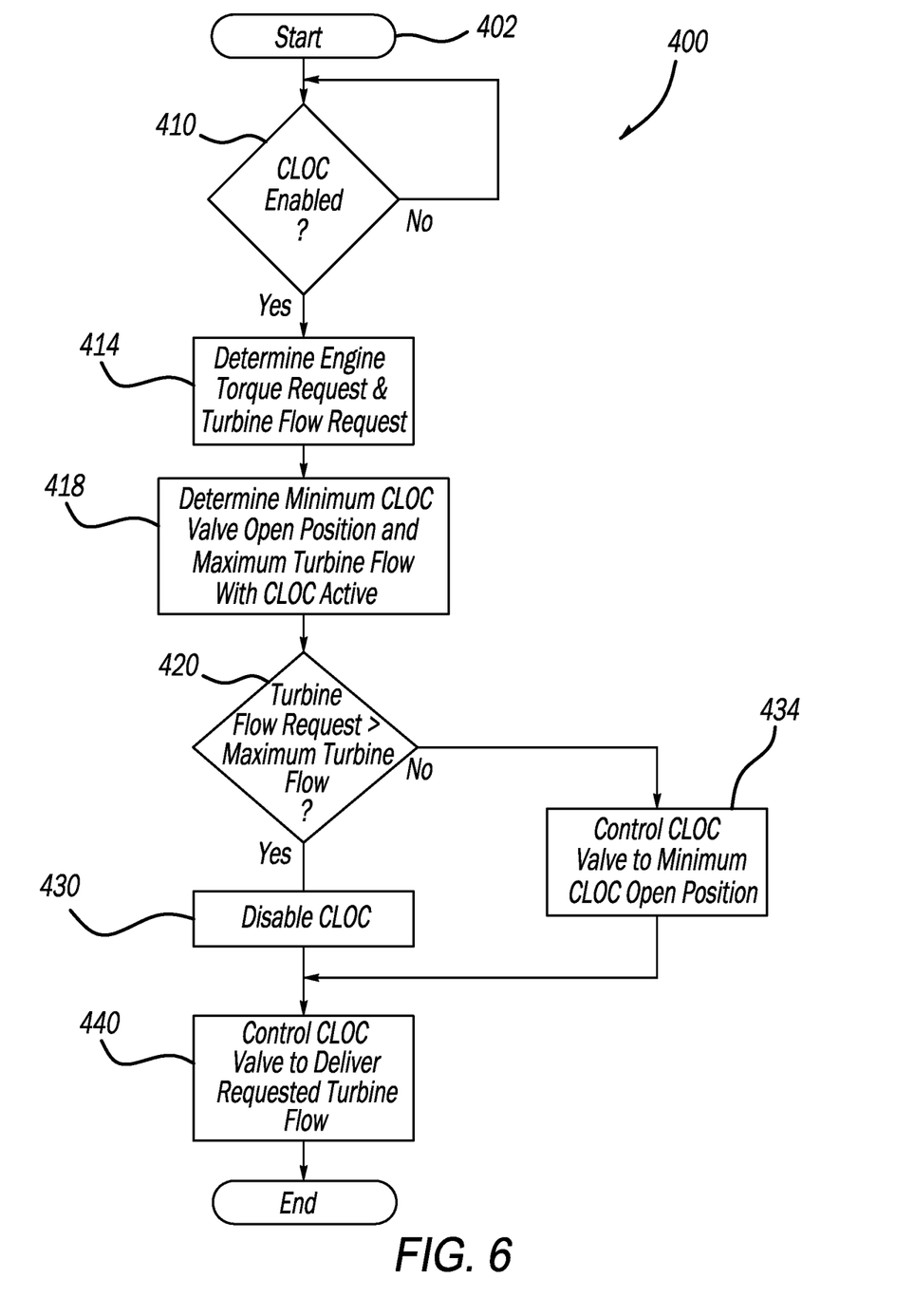
FIG. 6 is yet another flow diagram of example control of the cold light off catalyst at high torque request according to examples of the present disclosure.

Referring now to FIG. 6, a flow chart of an example method 400 of operating the engine 104 having the turbocharger 128, CLOC 172 and CLOC valve 176 is illustrated. For explanatory purposes, components of the vehicle 100 will be referenced, but it will be appreciated that this method 400 could be used for any engine having a turbocharger and CLOC. Control starts at 402. At 410, the controller 190 determines whether CLOC is enabled. Again, CLOC operation can be enabled such as at startup of the engine 104 when the main catalyst 184 has not reached optimal operating temperature. At 414 control determines an engine torque request and a turbine flow request. At 418 control determines a minimum CLOC valve open position and maximum turbine flow with CLOC active.

At 420 control determines whether the turbine flow request is greater than a maximum turbine flow. If not, control the CLOC valve 176 to a minimum CLOC open position at 434. At 434 control modulates a partial flow between the CLOC 172 and the turbocharger 128 to meet the desired boost if possible while also delivering some amount of emissions benefit with the CLOC 172. If control determines that the turbine flow request is greater than a maximum turbine flow with CLOC active, CLOC is disabled at 430. At 440 control controls the CLOC valve 176 to deliver requested turbine flow. Control ends at 444.

It will be appreciated that the term "controller" as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It should be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A control system for an engine comprising a turbocharger, the system comprising:
   a cold light off catalyst (CLOC) positioned in a bypass passage around a turbine of the turbocharger;
   a CLOC valve that selectively routes exhaust flow from the engine between the turbine and the CLOC; and
   a controller configured to:
   determine an engine torque request;
   determine an intake manifold pressure target;
   determine whether the intake manifold pressure target is greater than a barometric pressure;
   command the CLOC valve to a first position whereby all exhaust flow is routed to the CLOC in a CLOC mode based on the intake manifold pressure target is not greater than the barometric pressure;
   command the CLOC valve to a second position whereby exhaust flow is routed fully to the turbocharger based on the intake manifold pressure target is greater than the barometric pressure; and
   modulate the CLOC valve whereby exhaust flow is routed, at least partially, to the CLOC and at least partially to the turbocharger based on an optimization model that determines an optimal balance between engine torque requirements and emissions requirements.

2. A control system for an engine comprising a turbocharger, the system comprising:
- a cold light off catalyst (CLOC) positioned in a bypass passage around a turbine of the turbocharger;
- a CLOC valve that selectively routes exhaust flow from the engine between the turbine and the CLOC; and
- a controller configured to:
  - determine an engine torque request;
  - determine a turbine flow request;
  - determine a minimum CLOC valve open position and a maximum turbine flow;
  - determine whether the turbine flow request is greater than the maximum turbine flow;
  - command the CLOC valve to a first position whereby exhaust flow is routed, at least partially, to the CLOC in a CLOC mode based on the turbine flow request not being greater than the maximum turbine flow;
  - command the CLOC valve to a second position whereby exhaust flow is routed fully to the turbocharger based on the turbine flow request being greater than the maximum turbine flow; and
  - modulate the CLOC valve whereby exhaust flow is routed, at least partially, to the CLOC and at least partially to the turbocharger based on an optimization model that determines an optimal balance between engine torque requirements and emissions requirements.

3. The control system of claim 2, wherein commanding the CLOC valve to the first position comprises commanding the CLOC valve to a position wherein all exhaust flow is directed to the CLOC.

4. The control system of claim 2, wherein determining the turbine flow request includes receiving a signal based on an accelerator pedal input.

5. A control system for an engine comprising a turbocharger, the system comprising:
- a cold light off catalyst (CLOC) positioned in a bypass passage around a turbine of the turbocharger;
- a CLOC valve that selectively routes exhaust flow from the engine between the turbine and the CLOC; and
- a controller configured to:
  - determine an engine torque request;
  - determine whether full turbine is required to meet the engine torque request;
  - command the CLOC valve to a first position whereby exhaust flow is routed, at least partially, to the CLOC in a CLOC mode based on determining that full turbine is not required to meet the engine torque request;
  - command the CLOC valve to a second position whereby exhaust flow is routed fully to the turbocharger based on determining that full turbine is required to meet the engine torque request; and
  - modulate the CLOC valve whereby exhaust flow is routed, at least partially, to the CLOC and at least partially to the turbocharger based on an optimization model that determines an optimal balance between engine torque requirements and emissions requirements.

6. The control system of claim 5, wherein commanding the CLOC valve to the first position comprises commanding the CLOC valve to a position wherein all exhaust flow is directed to the CLOC.

7. The control system of claim 6, wherein determining whether full turbine is required includes determining a turbine flow request based on an accelerator pedal input.

* * * * *